United States Patent
Xu et al.

(10) Patent No.: US 11,299,584 B2
(45) Date of Patent: Apr. 12, 2022

(54) PREPARATION METHOD FOR POLYLACTIC ACID GRAFTED CHITOSAN NANOWHISKERS

(71) Applicant: Jiangnan University, Wuxi (CN)

(72) Inventors: Helan Xu, Wuxi (CN); Guiqing Luo, Wuxi (CN); Bomou Ma, Wuxi (CN); Xiuliang Hou, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 17/481,643

(22) Filed: Sep. 22, 2021

(65) Prior Publication Data

US 2022/0002482 A1    Jan. 6, 2022

Related U.S. Application Data

(63) Continuation of application No. PCT/CN2020/119238, filed on Sep. 30, 2020.

(30) Foreign Application Priority Data

Sep. 30, 2019  (CN) .......................... 2019109421723

(51) Int. Cl.
| | | |
|---|---|---|
| C08G 63/82 | (2006.01) | |
| C08G 63/08 | (2006.01) | |
| C08L 5/08 | (2006.01) | |
| C08L 67/04 | (2006.01) | |
| C08L 87/00 | (2006.01) | |
| B82Y 30/00 | (2011.01) | |
| B82Y 40/00 | (2011.01) | |

(52) U.S. Cl.
CPC .......... *C08G 63/823* (2013.01); *C08G 63/08* (2013.01); *C08L 5/08* (2013.01); *C08L 67/04* (2013.01); *C08L 87/005* (2013.01); *B82Y 30/00* (2013.01); *B82Y 40/00* (2013.01)

(58) Field of Classification Search
CPC .......... C08G 63/823; C08G 63/08; C08L 5/08; C08L 67/04; C08L 87/005; B82Y 30/00; B82Y 40/00
See application file for complete search history.

(56) References Cited

U.S. PATENT DOCUMENTS

2019/0134262 A1    5/2019 Deng et al.

FOREIGN PATENT DOCUMENTS

| CN | 1948345 A | 4/2007 | |
|---|---|---|---|
| CN | 101580556 A | * 11/2009 | ............. C08B 37/08 |
| CN | 101736438 A | 6/2010 | |
| CN | 103059319 A | * 4/2013 | ................ C08J 3/00 |
| CN | 103059319 A | 4/2013 | |
| CN | 103467752 A | 12/2013 | |
| CN | 105001425 A | 10/2015 | |
| CN | 109721740 A | 5/2019 | |
| KR | 20040028515 A | 4/2004 | |

OTHER PUBLICATIONS

Hardiansyah, A., et al.; Journal of Polymer Research, 2015, vol. 22, issue 59, p. 1-10.*
Wan, Y., et al.; Acta Biomaterialia, 2008, vol. 4, p. 876-886.*
Skotak, M., et al.; Biomacromolecules, 2008, vol. 9, p. 1902-1908.*

* cited by examiner

*Primary Examiner* — Robert S Jones, Jr.
(74) *Attorney, Agent, or Firm* — IPro, PLLC

(57) ABSTRACT

Disclosed is a preparation method for polylactic acid grafted chitosan nanowhiskers, and belongs to the technical field of materials. The preparation method of the disclosure is that after lactide, a catalyst and chitosan are uniformly mixed, polymerization grafting is performed to prepare PLA-g-CS, and then the PLA-g-CS is dispersed into an alkali liquor to obtain nanowhiskers by a repeated freezing/unfreezing method, with no solvent used in a polymerization grafting process. The method has advantages that the nanowhiskers can be prepared from the PLA-g-CS without a good solvent, and the whole reaction is efficient, clean, and environmentally friendly.

3 Claims, 2 Drawing Sheets

PREPARATION METHOD FOR POLYLACTIC ACID GRAFTED CHITOSAN NANOWHISKERS

TECHNICAL FIELD

The disclosure herein relates to a preparation method for polylactic acid grafted chitosan (PLA-g-CS) nanowhiskers, and belongs to the field of materials.

BACKGROUND

Organic nanomaterials refer to novel nanomaterials based on lipids, proteins, polysaccharides and organic macromolecules or polymers. With the continuous development and application of nanotechnology, nanomaterials have been widely applied to the fields of food, biomedicine, agriculture, environment, etc. Nanomaterials have unique physical and chemical properties due to their nano-level size effects, and have brought new innovative development opportunities for the fields of food, agriculture, industry, etc. Polysaccharide nanowhiskers have excellent biochemical properties such as good biocompatibility, good biodegradability, non-toxicity, easy modification and nano-size functionality, and thus have been widely investigated, and applied to different fields, especially to composite materials. The research of nanocomposite materials based on natural macromolecules and polymers has been intensified.

In recent years, chitosan/polylactic acid composite materials have received wide attention due to their good antibacterial properties, biocompatibility and degradability. At present, there are many literatures about polymerization grafting of chitosan. After the chitosan is grafted with polylactic acid, amine groups of the chitosan react with carboxyl groups of the polylactic acid, produce amides to connect polylactic acid chain segments. Thus, overall hydrophilicity of side chains is reduced. Since the polylactic acid grafted chitosan (PLA-g-CS) is insoluble in neither acetic acid nor chloroform, it is difficult to make the PLA-g-CS into nanoscale particles. Therefore, preparation of nanowhiskers from the PLA-g-CS has not been studied by scholars yet.

SUMMARY

In order to solve the above problems, the disclosure adopts a dry grafting method to prepare PLA-g-CS. Subsequently, the PLA-g-CS is dispersed in an alkali liquor to obtain nanowhiskers by a repeated freezing/unfreezing method. By adopting the method, the nanowhiskers can be prepared and obtained from the PLA-g-CS. The whole process is efficient, clean, and environmentally friendly, and certain generalizability is realized.

The disclosure discloses a preparation method for a polylactic acid grafted chitosan (PLA-g-CS) nanowhiskers. The method includes the following steps:

(1) preparation of PLA-g-CS: after lactide, a catalyst and chitosan are uniformly mixed, performing polymerization grafting to prepare and obtain the PLA-g-CS, with no solvent used in the polymerization grafting process; and (2) preparation of PLA-g-CS nanowhiskers: dispersing the PLA-g-CS prepared in step (1) in a mixed solution of NaOH:urea:$H_2O$ or LiOH:KOH:urea:$H_2O$ to obtain the PLA-g-CS nanowhiskers after freezing/unfreezing, ultrasonic treatment, centrifugation and dialysis.

In an embodiment of the disclosure, in step (1), a mass ratio of the lactide to the chitosan is (2-10):1, a catalyst is stannous octoate, and an amount of the stannous octoate added is 0.1 to 1‰ of the mass percentage of the lactide.

In an embodiment of the disclosure, in step (1), and polymerization grafting conditions are nitrogen gas atmosphere, a grafting temperature of 120 to 180° C., and grafting time of 3 to 5 h.

In an embodiment of the disclosure, an amount of the PLA-g-CS added is in a range of 0.25% to 1%.

In an embodiment of the disclosure, in step (2), NaOH:urea:$H_2O$=(8-15):(4-8):(80-85).

In an embodiment of the disclosure, in step (2), LiOH:KOH:urea:$H_2O$=(8-15):(5-9):8:(80-85).

In an embodiment of the disclosure, in step (2), freezing conditions are a temperature in a range of −80 to −20° C. and time in a range of 0.5 to 3 h; unfreezing conditions are a temperature in a range of 5 to 10° C. and time in a range of 0.1 to 0.5 h; and freezing/unfreezing cycles for 2 to 5 times.

In an embodiment of the disclosure, in step (2), an ultrasonic frequency is in a range of 30 to 60 Hz, and the time is in a range of 10 to 30 min.

In an embodiment of the disclosure, in step (2), a centrifugation rotating speed is in a range of 5000 to 10000 r/min, and the time is in a range of 15 to 30 min.

The disclosure discloses PLA-g-CS nanowhiskers prepared by the method.

The disclosure further discloses applications of the PLA-g-CS nanowhiskers in aspects of food packaging, medicine and composite materials.

The disclosure has the following beneficial effects:

(1) In the disclosure, polylactic acid is used to graft chitosan, the hydrophobicity and mechanical properties of the chitosan can be enhanced. At the same time, eco-friendly effects and degradability can be achieved. According to existing chitosan and polylactic acid grafting methods at present, solvents are used as reaction media, or even a large number of solvents are needed to precipitate grafts. The grafting method used in the disclosure adopts dry grafting. That is, lactide is in a molten state at 120 to 150° C., the lactide can achieve ring-opening polymerization and can take a polymerization reaction with the chitosan without the use of a solvent as a reaction medium. The reaction process is environmentally friendly, simple and efficient. A grafting rate can be as high as 97%. At the same time, grafted products have potential applications in aspects of food packaging, medicine or use as reinforcements for composite materials, etc.

(2) According to the disclosure, nanowhiskers are prepared from the PLA-g-CS which is almost insoluble by a method of repeatedly freezing and unfreezing in an alkali liquor. Chitosan has good biodegradability, biocompatibility, antibacterial performance and multifunctional chemical and physical properties. Polylactic acid is obtained by polymerizing lactic acid, which is a renewable resource with abundance and biocompatibility, and can be completely degraded into water and carbon dioxide without polluting the environment. Therefore, after made into nanowhiskers, grafted products have wide application prospects in aspects of food packaging, medicine or reinforcements for composite materials, and the like, and especially have huge potentials in aspects of biomedical care and reinforced composite materials.

DETAILED DESCRIPTION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Example 1

Figure 1:
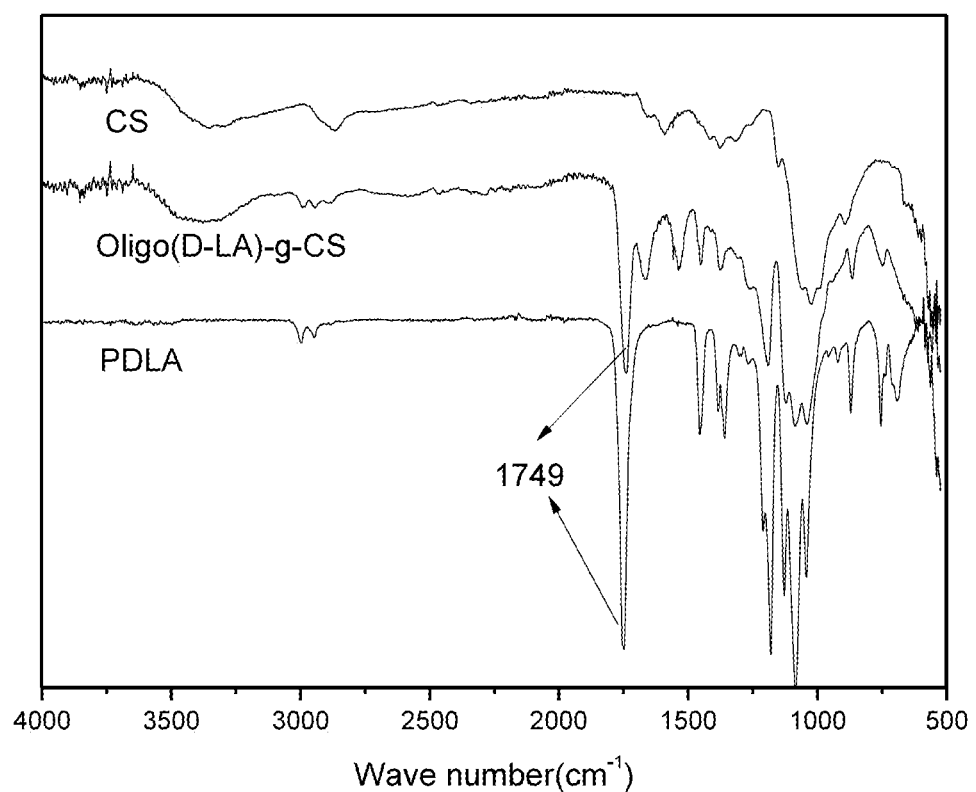
FIG. 1 is an infrared spectrogram of poly-D-lactic acid (PDLA), chitosan (CS) and oligo-D-lactic acid grafted chitosan (Oligo(D-LA)-g-CS).
Figure 2:
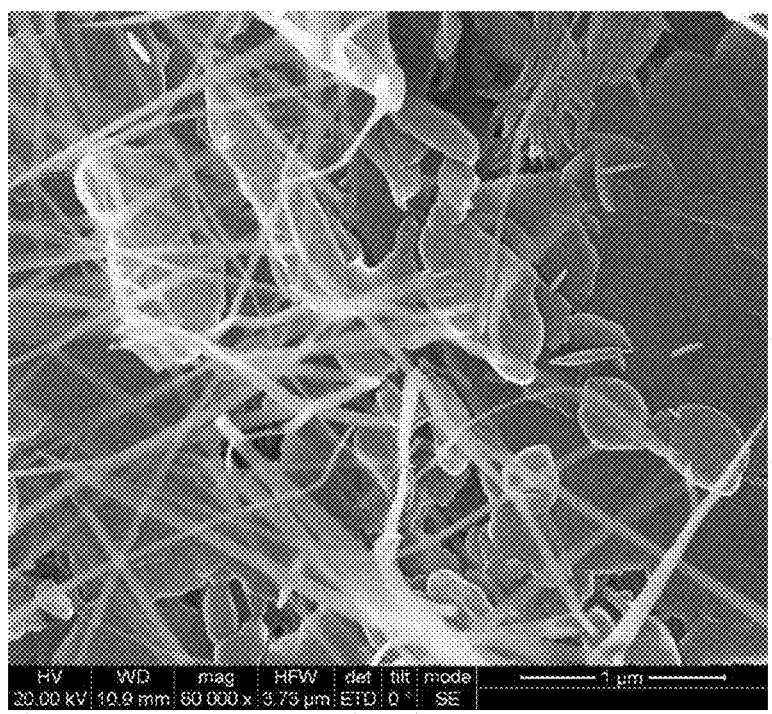
FIG. 2 is an SEM image of nanowhiskers of polylactic acid and chitosan graft prepared according to Example 1 of the disclosure.

10 g of lactide, 5 g of chitosan and 5 μL of stannous octoate were respectively and quickly put into a three-neck flask for a polymerization grafting reaction. At the same time, magnetons were added for stirring. A grafting temperature was 150° C., grafting time was 4 h, a grafting atmosphere was a nitrogen gas atmosphere, and a rotating speed of a stirrer was 150 r/min. A polylactic acid and chitosan graft, PLA-g-CS (as shown in FIG. 1), was obtained with a grafting rate was 95%. 0.025 g of PLA-g-CS was dispersed in 9.975 g of a mixed solution of NaOH:urea:$H_2O$=11:4:85. Then, a suspension was frozen at −30° C. for 3 h. Next, the suspension was stirred for unfreezing at 5° C. The freezing/unfreezing cycled 3 times. The solution was subjected to ultrasonic treatment at 60 Hz for 30 min by an ultrasonic cell grinder. After ultrasonic treatment, the solution was centrifugated at a rotating speed of 10000 r/min for 15 min to obtain a supernatant. The supernatant was charged into a dialysis bag to be dialyzed for 48 h. Freeze drying was performed to obtain PLA-g-CS nanowhiskers with continuous length (as shown in FIG. 2). An average diameter was 281.1 nm.

Example 2

10 g of lactide, 5 g of chitosan and 5 μL of stannous octoate were respectively and quickly put into a three-neck flask for a polymerization grafting reaction. At the same time, magnetons were added for stirring. A grafting temperature was 150° C., grafting time was 4 h, a grafting atmosphere was a nitrogen gas atmosphere, and a rotating speed of a stirrer was 150 r/min. A polylactic acid and chitosan graft PLA-g-CS was obtained with a grafting rate of 95%. 0.05 g of PLA-g-CS was dispersed in 9.975 g of a mixed solution of NaOH:urea:$H_2O$=11:4:85. Then, a suspension was frozen at −30° C. for 3 h. Next, the suspension was stirred for unfreezing at 5° C. The freezing/unfreezing cycled 3 times. The solution was subjected to ultrasonic treatment for at 60 Hz 30 min by an ultrasonic cell grinder. After the ultrasonic treatment, the solution was centrifugated at a rotating speed of 10000 r/min for 15 min to obtain a supernatant. The supernatant was charged into a dialysis bag to be dialyzed for 48 h. Freeze drying was performed to obtain PLA-g-CS nanowhiskers with continuous length. An average diameter was 502.7 nm.

Example 3

10 g of lactide, 5 g of chitosan and 5 μL of stannous octoate were respectively and quickly put into a three-neck flask for a polymerization grafting reaction. At the same time, magnetons were added for stirring. A grafting temperature was 150° C., grafting time was 4 h, a grafting atmosphere was a nitrogen gas atmosphere, and a rotating speed of a stirrer was 150 r/min. A polylactic acid and chitosan graft PLA-g-CS was obtained with a grafting rate was 95%. 0.1 g of PLA-g-CS was dispersed in 9.975 g of a mixed solution of NaOH:urea:$H_2O$=11:4:85. Then, a suspension was frozen at −30° C. for 3 h. Next, the suspension was stirred for unfreezing at 5° C. The freezing/unfreezing cycled 3 times. The solution was subjected to ultrasonic treatment at 60 Hz for 30 min by an ultrasonic cell grinder. After the ultrasonic treatment, the solution was centrifugated for 15 min at a rotating speed of 10000 r/min to obtain a supernatant. The supernatant was charged into a dialysis bag to be dialyzed for 48 h. Freeze drying was performed to obtain PLA-g-CS nanowhiskers with continuous length. An average diameter was 893.6 nm.

Example 4

10 g of lactide, 5 g of chitosan and 5 μL of stannous octoate were respectively and quickly put into a three-neck flask for a polymerization grafting reaction. At the same time, magnetons were added for stirring. A grafting temperature was 150° C., the grafting time was 4 h, a grafting atmosphere was a nitrogen gas atmosphere, and a rotating speed of a stirrer was 150 r/min. A polylactic acid and chitosan graft PLA-g-CS was obtained with a grafting rate of 95%. 0.025 g of PLA-g-CS was dispersed in 9.975 g of a mixed solution of NaOH:urea:$H_2O$=11:4:85. Then, a suspension was frozen at −30° C. for 2 h. Next, the suspension was stirred for unfreezing at 5° C. The freezing/unfreezing cycled 3 times. The solution was subjected to ultrasonic treatment at 60 Hz for 30 min by an ultrasonic cell grinder. After the ultrasonic treatment, the solution was centrifugated at a rotating speed of 10000 r/min for 15 min to obtain a supernatant. The supernatant was charged into a dialysis bag to be dialyzed for 48 h. Freeze drying was performed to obtain PLA-g-CS nanowhiskers with continuous length. An average diameter was 699.5 nm.

Example 5

10 g of lactide, 5 g of chitosan and 5 μL of stannous octoate were respectively and quickly put into a three-neck flask for a polymerization grafting reaction. At the same time, magnetons were added for stirring. A grafting temperature was 150° C., grafting time was 4 h, a grafting atmosphere was a nitrogen gas atmosphere, and a rotating speed of a stirrer was 150 r/min. A polylactic acid and chitosan graft PLA-g-CS was obtained with a grafting rate of 95%. 0.025 g of PLA-g-CS was dispersed in 9.975 g of a mixed solution of NaOH:urea:$H_2O$=11:4:85. Then, a suspension was frozen at −30° C. for 1 h. Next, the suspension was stirred for unfreezing at 5° C. The freezing/unfreezing cycled 3 times. The solution was subjected to ultrasonic treatment at 60 Hz for 30 min by an ultrasonic cell grinder. After the ultrasonic treatment, the solution was centrifugated at a rotating speed of 10000 r/min for 15 min to obtain a supernatant. The supernatant was charged into a dialysis bag to be dialyzed for 48 h. Freeze drying was performed to obtain PLA-g-CS nanowhiskers with continuous length. An average diameter was 996.2 nm.

Example 6

10 g of lactide, 5 g of chitosan and 5 μL of stannous octoate were respectively and fast put into a three-neck flask for a polymerization grafting reaction. At the same time, magnetons were added for stirring. A grafting temperature was 150° C., grafting time was 4 h, a grafting atmosphere was a nitrogen gas atmosphere, and a rotating speed of a stirrer was 150 r/min. A polylactic acid and chitosan graft PLA-g-CS was obtained with a grafting rate of 95%. 0.025 g of PLA-g-CS was dispersed in 9.975 g of a mixed solution of NaOH:urea:$H_2O$=11:4:85. Then, a suspension was frozen at −80° C. for 0.5 h. Next, the suspension was stirred for unfreezing at 5° C. The freezing/unfreezing cycled 3 times. The solution was subjected to ultrasonic treatment at 60 Hz for 30 min by an ultrasonic cell grinder. After the ultrasonic treatment, the solution was centrifugated at a rotating speed of 10000 r/min for 15 min to obtain a supernatant. The supernatant was charged into a dialysis bag to be dialyzed for 48 h. Freeze drying was performed to obtain PLA-g-CS nanowhiskers with continuous length. An average diameter was 332.0 nm.

Example 7

10 g of lactide, 5 g of chitosan and 5 μL of stannous octoate were respectively and quickly put into a three-neck flask for a polymerization grafting reaction. At the same time, magnetons were added for stirring. A grafting temperature was 150° C., grafting time was 4 h, a grafting atmosphere was a nitrogen gas atmosphere, and a rotating speed of a stirrer was 150 r/min. A polylactic acid and chitosan graft PLA-g-CS was obtained with a grafting rate of 95%. 0.025 g of PLA-g-CS was dispersed in 9.975 g of a mixed solution of NaOH:urea:$H_2O$=11:8:81. Then, a suspension was frozen at −80° C. for 0.5 h. Next, the suspension was stirred for unfreezing at 5° C. The freezing/unfreezing cycled 3 times. The solution was subjected to ultrasonic treatment at 60 Hz for 30 min by an ultrasonic cell grinder. After the ultrasonic treatment, the solution was centrifugated at a rotating speed of 10000 r/min for 15 min to obtain a supernatant. The supernatant was charged into a dialysis bag to be dialyzed for 48 h. Freeze drying was performed to obtain PLA-g-CS nanowhiskers with continuous length. An average diameter was 725.7 nm.

Example 8

10 g of lactide, 5 g of chitosan and 5 μL of stannous octoate were respectively and quickly put into a three-neck flask for a polymerization grafting reaction. At the same time, magnetons were added for stirring. A grafting temperature was 150° C., grafting time was 4 h, a grafting atmosphere was a nitrogen gas atmosphere, and a rotating speed of a stirrer was 150 r/min. A polylactic acid and chitosan graft PLA-g-CS was obtained with a grafting rate of 95%. 0.025 g of PLA-g-CS was dispersed in 9.975 g of a mixed solution of LiOH:KOH:urea:$H_2O$=4.5:7:8:80.5. Then, a suspension was frozen at −30° C. for 3 h. Next, the suspension was stirred for unfreezing at 5° C. The freezing/unfreezing cycled 3 times. The solution was subjected to ultrasonic treatment at 60 Hz for 30 min by an ultrasonic cell grinder. After the ultrasonic treatment, the solution was centrifugated at a rotating speed of 10000 r/min for 15 min to obtain a supernatant. The supernatant was charged into a dialysis bag to be dialyzed for 48 h. Freeze drying was performed to obtain PLA-g-CS nanowhiskers with continuous length. An average diameter was 361.9 nm.

TABLE 1

Performance of PLA-g-CS nanowhiskers

| Sample | Amount of PLA-g-CS added/% | Solution | Freezing temperature/° C. | Freezing time/h | Particle size (nm) |
|---|---|---|---|---|---|
| Example 1 | 0.25 | NaOH: urea: $H_2O$ = 11:4:85 | −30 | 3 | 281.1 |
| Example 2 | 0.5 | NaOH: urea: $H_2O$ = 11:4:85 | −30 | 3 | 502.7 |
| Example 3 | 1 | NaOH: urea: $H_2O$ = 11:4:85 | −30 | 3 | 893.6 |
| Example 4 | 0.25 | NaOH: urea: $H_2O$ = 11:4:85 | −30 | 2 | 699.5 |
| Example 5 | 0.25 | NaOH: urea: $H_2O$ = 11:4:85 | −30 | 1 | 996.2 |
| Example 6 | 0.25 | NaOH: urea: $H_2O$ = 11:4:85 | −80 | 0.5 | 332.0 |
| Example 7 | 0.25 | NaOH: urea: $H_2O$ = 11:8:81 | −80 | 0.5 | 725.7 |
| Example 8 | 0.25 | LiOH: KOH: urea: $H_2O$ = 4.5:7:8:80.5 | −30 | 3 | 361.9 |

From Table 1, it can be seen that the average diameter of the PLA-g-CS nanowhiskers obtained in Example 1 was the smallest (281.1 nm). According to a single factor variable principle, under the condition of unchanged other conditions, with the increase of the proportion of the PLA-g-CS in the solution, the average diameter of the nanowhiskers is continuously increasing. This is because with the increase of the proportion of the PLA-g-CS, the damage capability of the certain solution to its crystalline region is reduced, and the average diameter of the obtained nanowhiskers is greater. Under the condition that other conditions were unchanged but only the freezing time was changed, from the above table, it can be seen that the longer the freezing time, the smaller the particle size of the nanowhiskers, indicating that the damage of the solution to the PLA-g-CS crystalline region is a slow process, so that sufficient time is needed for completing this process. At −80° C., the average diameter of the obtained nanowhiskers are basically identical to that obtained at −20° C., but the freezing time is shorter. The reason is that the −80° C. condition has a violent damage to the PLA-g-CS crystalline region, so that the required time is shorter. The average diameter of the whisker obtained by using a solution system of NaOH:urea:$H_2O$=11:8:81 is larger. The reason is that this system is not suitable for dissolving the PLA-g-CS, and the damage capability to the crystalline region is weak. The average diameter of the PLA-g-CS nanowhiskers obtained by using a solution system of LiOH:KOH:urea:$H_2O$=4.5:7:8:80.5 is a little smaller than that of the PLA-g-CS nanowhiskers obtained by using a solution system of NaOH:urea:$H_2O$=11:4:81, and is basically equivalent to the average diameter of the nanowhiskers obtained by using the solution system of NaOH:urea:$H_2O$=11:4:81. Under the same conditions, unmodified CS and PLA-g-CS with a grafting rate of smaller than 50% cannot be dissolved under the same conditions, so that nanoparticles or nanowhiskers cannot be prepared under such conditions.

Example 9 Application of Nanowhiskers as Reinforcements for Composite Materials 5 wt % of chitin and 5 wt % chitin with 1% (mass ratio based on the chitin) PLA-g-CS nanowhiskers obtained in Example 1 were dispersed in an NaOH solution (NaOH: urea:H2O=11:4:85, w/w/w), were frozen at −80° C. for 30 min, and were then stirred for unfreezing at 5° C., and the freezing/unfreezing cycled 3 times in such a way to obtain a transparent solution. A 0.5 mm liquid film was prepared by a casting method, and was put into a 45% v/v ethanol solution of 5° C. to be solidified for 3 h to prepare hydrogel. The hydrogel was subjected to microscopic compression mechanical property test by using a nano indentor.

Figure 3:
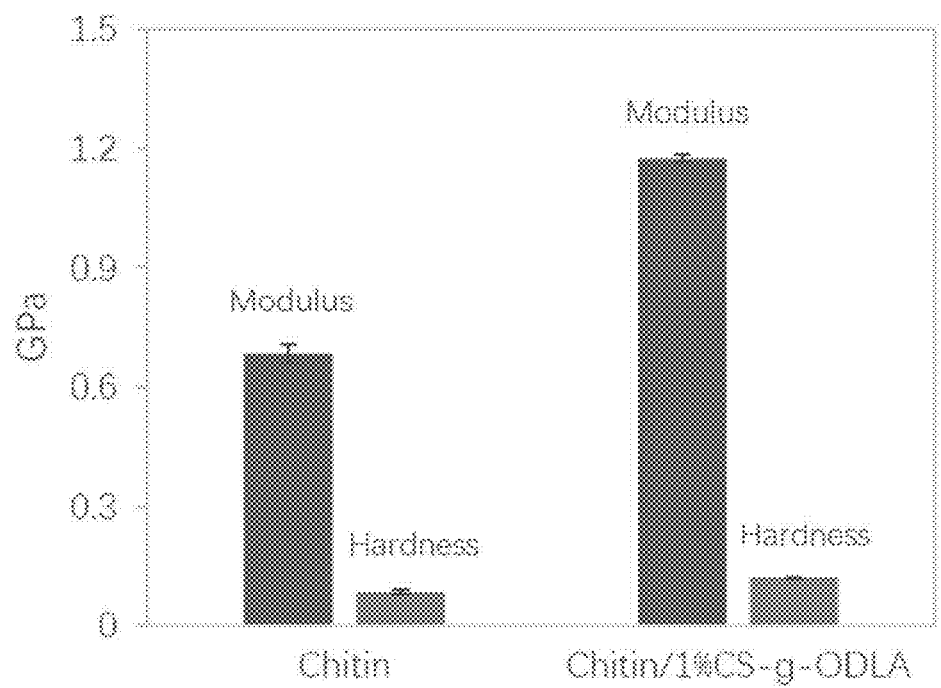
FIG. 3 showing microscopic compression performance comparison between chitin hydrogel and chitin hydrogel enhanced by the polylactic acid grafted chitosan nanowhiskers.

The results can be seen from FIG. 3. Both the modulus and hardness of the chitin hydrogel with the nanowhiskers were obviously improved. The modulus is raised from 0.7 GPa before addition to 1.2 GPa after addition, improved by 72%, and the hardness is raised from 91 MPa before addition to 126 MPa after addition, improved by 41%. The results show that the nanowhiskers can achieve a good reinforcement effect in the hydrogel.

Although the disclosure has disclosed the above examples, it is not intended to limit the disclosure, and various changes and modifications may be made by those skilled in the art without departing from the spirit and scope of the disclosure. Therefore, the protection scope of the disclosure shall be defined by the appended claims.

What is claimed is:

1. A method for preparation of a polylactic acid grafted chitosan (PLA-g-CS) nanowhisker, wherein the method is that: after lactide, a catalyst and chitosan are uniformly mixed, polymerization grafting is performed to prepare PLA-g-CS, and then the PLA-g-CS is dispersed into an alkali liquor to obtain the nanowhiskers by a repeated freezing/unfreezing method, with no solvent used in the polymerization grafting process; and wherein the method comprises:
    (1) preparation of PLA-g-CS: after adding lactide, a catalyst and chitosan are uniformly mixed, performing polymerization grafting to prepare and obtain the PLA-g-CS, wherein a mass ratio of the lactide to the chitosan is (2-10):1; and polymerization grafting conditions are: nitrogen gas atmosphere, a grafting temperature of 120 to 180° C., and grafting time of 3 to 5 hours; and
    (2) preparation of a PLA-g-CS nanowhisker: dispersing the PLA-g-CS prepared in step (1) in a mixed solution of NaOH:urea:$H_2O$ or LiOH:KOH:urea:$H_2O$ to obtain the PLA-g-CS nanowhisker and carrying out freezing/unfreezing, ultrasonic treatment, centrifugation and dialysis, wherein NaOH:urea:$H_2O$=11:4:81, and LiOH:KOH:urea:$H_2O$=(8-15):(5-9):8:(80-85); and
    an amount of the PLA-g-CS added is in a range of 0.25% to 0.5%.

2. The method according to claim 1, wherein the catalyst is stannous octoate, and an amount of the stannous octoate added is 0.1 to 1‰ of the lactide.

3. The method according to claim 1, wherein freezing conditions in step (2) are a temperature in a range of −80 to −20° C. and time in a range of 0.5 to 3 hours; unfreezing conditions are a temperature in a range of 5 to 10° C. and time in a range of 0.1 to 0.5 hour; and number of freezing/unfreezing cycles is for 2 to 5 times.

* * * * *